UNITED STATES PATENT OFFICE.

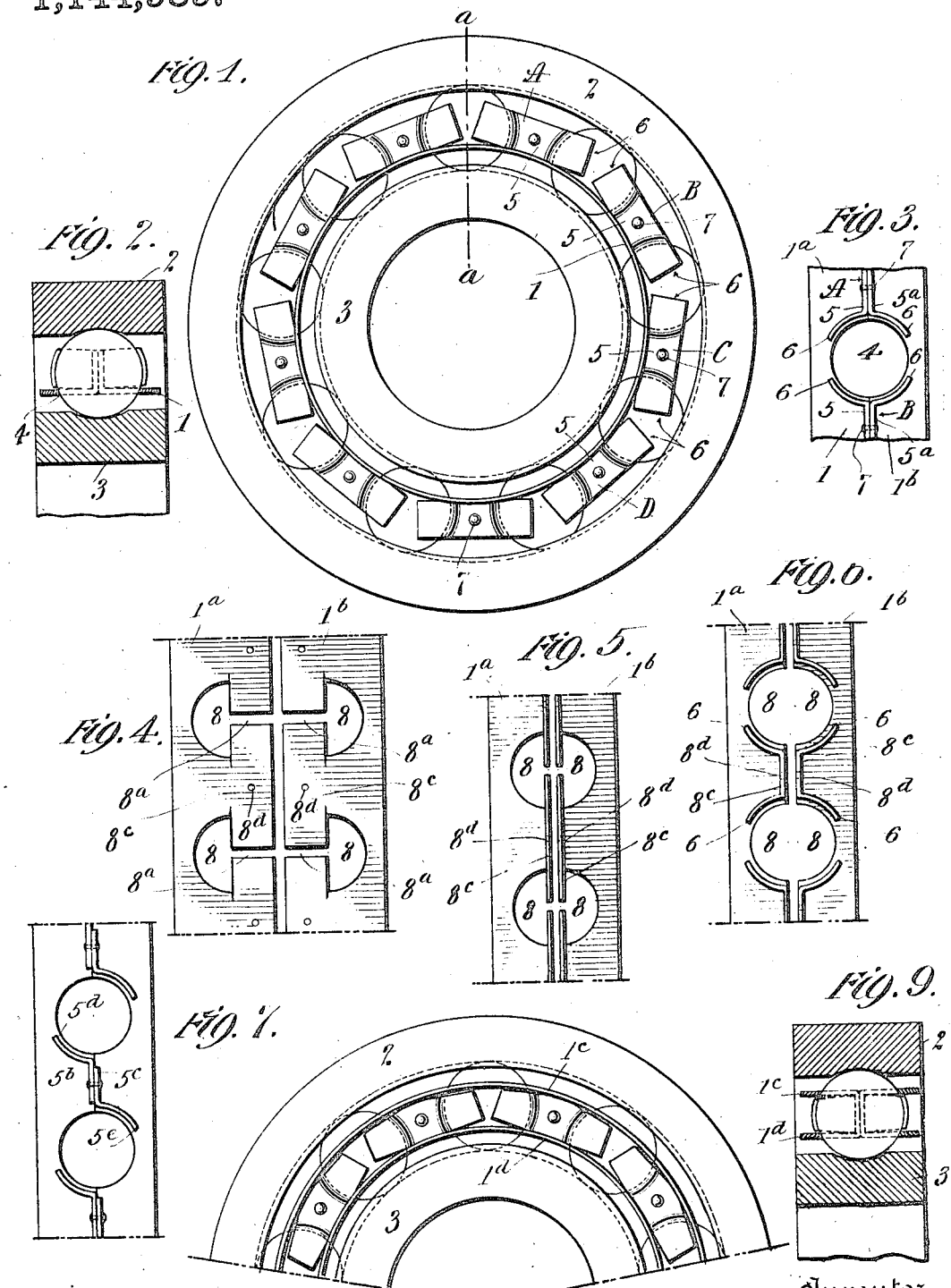

WILLIAM LORRAIN BATT, OF PHILADELPHIA, PENNSYLVANIA, ASSIGNOR TO THE HESS-BRIGHT MANUFACTURING CO., A CORPORATION OF DELAWARE.

CAGE FOR BALL-BEARINGS.

1,144,989.          Specification of Letters Patent.          Patented July 6, 1915.

Application filed August 2, 1911. Serial No. 641,950.

*To all whom it may concern:*

Be it known that I, WILLIAM LORRAIN BATT, a citizen of the United States, residing at Philadelphia, in the county of Philadelphia and State of Pennsylvania, have invented certain new and useful Improvements in Cages for Ball-Bearings, of which the following is a specification, reference being had therein to the accompanying drawing.

My invention relates to ball holding cages for ball bearings, and has reference more particularly to the type of cage embodying flaps or lips extending between the balls and formed to hold them in spaced relations while permitting of their individual rotation.

The invention has in view the production of a cage of this general type especially adapted for use in connection with ball bearings applied to parts driven at high speeds, and under such conditions a cage in order to properly and effectively perform its function, should be light, well balanced, true yet springy in its hold on the balls, and uniform and accurate in its revolution between the casing elements of the bearing.

My invention comprehends an improved construction of cage adapted to fulfil the above requirements, the chief characteristic of which is the provision of pairs of flaps or fingers projecting from a ring or base at intervals and extending between the balls, the flaps of a pair being separated at their ends so as to embrace the balls and thereby hold the same. The invention embodying these characteristics is susceptible of different forms of embodiment, a number of which are shown in the accompanying drawings, and it will be understood, therefore, that the invention is not limited to any particular form or construction of the parts except in so far as such limitations are specified in the claim.

In the accompanying drawings: Figure 1 is a side elevation of my improved cage in one form, showing the same in operative position in a bearing. Fig. 2 is a transverse section through the same on the line $a$—$a$. Fig. 3 is a plan view of a portion of the cage. Fig. 4 is a plan view of the complementary blanks from which the cage is preferably formed. Fig. 5 is a similar view showing the first stage of the shaping of the blanks. Fig. 6 is a similar view showing the next stage of the shaping of the blanks. Fig. 7 is a plan view showing my cage in slightly modified form. Fig. 8 is a side elevation of a portion of the cage in still another modified form. Fig. 9 is a transverse section through the same on the line $b$—$b$ of Fig. 8.

Referring to the drawings: Referring to Figs. 1, 2 and 3, which show one embodiment of my invention, that which I prefer to adopt, the cage as illustrated is formed from thin sheet metal and comprises a ring or base 1 adapted to extend between casing members 2 and 3 of the bearing, and formed at intervals with openings 4 to receive and afford seats for the balls of the bearings, which ring is proivded with pairs A, B, C, etc., of opposing flaps or lips 5, 5ª projecting from the ring at right angles thereto, the flaps of a pair extending flatly face to face between the openings in the ring, and being separated at their ends as at 6, so as to engage the balls at opposite sides and in this manner embrace the same. Where the flaps extend face to face, they are fastened firmly together, as by the provision of rivets 7, and when assembled in a bearing of the annular type shown in Fig. 1, the ring extends axially of the bearing, and the flaps project from the ring in a radial direction and extend circumferentially thereof, the separated ends of the adjacent pairs constituting conjointly and in connection with the openings in the ring, sockets or seats for the balls. It is preferable that the metal of which the cage is formed be of such character that the separated ends of the flaps will possess some degree of resiliency or spring, so that the balls will be yieldingly held, and while being maintained accurately in spaced relations, they will nevertheless be capable of a sufficient degree of freedom to permit them to readily rotate individually in the operation of the bearing. The flaps, where they extend and are secured face to face, form a stiff web between the balls, the effect of which is to strengthen and reinforce the cage in a circumferential direction, and to maintain its general circular form, so that the cage will revolve truly and evenly between the casing members. It will be observed that the flaps project centrally from the ring and that the balls are embraced centrally between the separated ends of the flaps, this arrangement and disposition of the parts assuring a perfect balancing of the masses, and avoiding liability of wedging action of the balls.

I prefer to construct the ring or base 1 of two complementary sections 1ª and 1ᵇ, as shown more particularly in Fig. 2, the opposing flaps of the pairs extending at right angles from these sections from the inner adjacent edges of the same, and the two sections being fastened together to form a single unitary structure by means of the rivets 7 before alluded to. In the formation of a cage of this construction, I provide complementary flat blanks of the form shown in Fig. 4, formed at intervals with semi-circular openings 8, from which slots 8ª extend to the edge of the blanks, the portions 8ᶜ of blanks between the slots being perforated as at 8ᵈ to receive the rivets 7 before alluded to. In the shaping of the blanks to form the cage, the portions 8ᶜ are bent at right angles to the body of the blanks on a line joining the inner walls of the semi-circular openings, as shown in Fig. 5, and then the ends of the bent-up portions lying within the area of the semi-circular openings, are bent outwardly in curved form, as shown in Fig. 3, to conform to the curved surface of the balls, the shaped blanks being at this stage of the operation, straight from end to end. In assembling the cage in the bearing, the balls are first introduced between casing members and then the two shaped blanks shown in Fig. 6 are applied from opposite sides, the flat portions 8ᶜ being placed together face to face with the rivet holes in alinement. Finally the rivets are passed through the holes and the two sections are firmly and effectively connected together in final finished form, as shown in Fig. 1.

In Fig. 7 I have shown my cage in slightly modified form. In this case the flaps 5ᵇ—5ᶜ of a pair have their ends separated, as at 5ᵈ—5ᵉ, so as to embrace the ball between them, each flap in this case being provided with but one ball-embracing end, whereas in the case first described each flap was provided with two ball-embracing ends. In other respects the construction is the same as that described in Fig. 1, this modified construction embodying a ring or base with pairs of opposing flaps 5ᵇ—5ᶜ projecting therefrom, the ends of said flaps being separated so as to engage and hold the ball between them. My broad invention, therefore, comprehends not only the construction first described, but also the modified construction of Fig. 7.

In Figs. 8 and 9 I have shown still another modification of my invention. In this case the cage is provided with two rings or bases 1ᶜ and 1ᵈ from which the opposing flaps extend and are located between the rings, the flaps as before being separated at their ends, so as to engage and embrace the balls between them. This construction also embodies the broad features of my invention heretofore set forth, and is intended to be embraced within the terms and substance of the claims.

While in the accompanying drawings I have shown my cage in its different forms as adapted for use in connection with a ball bearing of the annular type, it is manifest and obvious to persons skilled in this art that the invention is not limited to such bearings, but is adapted also for use in connection with bearings of the end thrust type.

Having thus described my invention, what I claim is:—

A ball holding cage for ball bearings, comprising two rings arranged edge to edge and extending in a common plane, said rings being provided in their adjacent edges, at intervals with opposing notches conjointly constituting ball holding pockets, and said rings being provided between the notches with opposing flanges extending at right angles to the plane of the ring and secured together face to face, the free ends of said flanges being bent outwardly and separated so as to embrace the balls between them.

In testimony whereof I have affixed my signature in presence of two witnesses.

WILLIAM LORRAIN BATT.

Witnesses:
GEO. M. HENRIE,
MARY M. CALLA.

Copies of this patent may be obtained for five cents each, by addressing the "Commissioner of Patents, Washington, D. C."